(12) United States Patent
Turunen

(10) Patent No.: US 6,477,644 B1
(45) Date of Patent: Nov. 5, 2002

(54) MOBILE INTERNET ACCESS

(75) Inventor: Matti Turunen, Tampere (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/245,770

(22) Filed: Feb. 5, 1999

(30) Foreign Application Priority Data

Feb. 9, 1998 (FI) ................................................. 980291

(51) Int. Cl.$^7$ ............................................... G06F 1/24
(52) U.S. Cl. ..................... 713/161; 713/168; 713/171; 380/247
(58) Field of Search ................. 380/247; 713/161, 713/168, 171

(56) References Cited

U.S. PATENT DOCUMENTS

| | | | |
|---|---|---|---|
| 5,175,758 A | 12/1992 | Levanto et al. ............... 379/57 |
| 5,189,632 A | 2/1993 | Paajanen et al. ........ 364/705.05 |
| 5,257,257 A | 10/1993 | Chen et al. .................... 370/18 |
| 5,353,328 A | 10/1994 | Jokimies ....................... 379/58 |
| 5,392,282 A | 2/1995 | Kiema .......................... 370/77 |
| 5,416,842 A | * 5/1995 | Aziz ........................... 380/285 |
| 5,604,921 A | 2/1997 | Alanara ....................... 455/45 |
| 5,657,371 A | 8/1997 | Suomi et al. ................ 455/418 |
| 5,684,873 A | 11/1997 | Tiilikainen .................. 379/354 |
| 5,692,032 A | 11/1997 | Seppanen et al. ............. 379/59 |
| 5,710,810 A | 1/1998 | Tiilikainen .................. 379/355 |
| 5,790,875 A | 8/1998 | Andersin et al. ...... 395/750.03 |
| 5,793,762 A | 8/1998 | Penners et al. .............. 370/389 |
| 5,794,142 A | 8/1998 | Vanttila et al. .............. 455/419 |
| 5,802,465 A | 9/1998 | Hamalainen et al. ....... 455/403 |
| 5,842,141 A | 11/1998 | Vaihoja et al. .............. 455/574 |
| 5,864,550 A | 1/1999 | Posti ........................... 370/338 |
| 6,070,245 A | * 5/2000 | Murphy et al. ............. 380/239 |
| 6,154,541 A | * 11/2000 | Zhang ......................... 380/28 |

FOREIGN PATENT DOCUMENTS

| | | |
|---|---|---|
| EP | 0 483 547 A1 | 5/1992 |
| EP | 0 556 012 A2 | 8/1993 |
| NL | 1007409 | 11/1997 |
| WO | WO 97/04611 | 2/1997 |
| WO | WO 97/31306 | 8/1997 |
| WO | WO 97/48210 | 12/1997 |

OTHER PUBLICATIONS

Finnish Official Action.
"Mobile IP", Perkins, IEEE Communications Magazine, vol. 35, No. 5, 1997, pp. 84–86, 91–99.
"IP Mobility Support", Perkins, 1996, RFC 2002.

* cited by examiner

*Primary Examiner*—Thomas R. Peeso
(74) *Attorney, Agent, or Firm*—Perman & Green, LLP

(57) ABSTRACT

A method of enabling roaming of a mobile internet-access host (9) from a local area network (3) to a GSM network (6), each network having a home agent (HA) for routing internet datagrams between networks. The method comprises deregistering the mobile terminal (9) from said local area network (3) and registering it with the GSM network (6) and allocating to the mobile host (9) a new internet address in the GSM network (6). An internet security key is sent via the GSM Short Message Service from the local area network's home agent (HA) to the mobile terminal (9). The new internet address is transmitted, together with authentication data generated using the security key, via the internet (5) to the local area network's home agent (HA) which registers that address as a care-of-address for the mobile host (9).

13 Claims, 2 Drawing Sheets

MOBILE INTERNET ACCESS

FIELD OF THE INVENTION

The present invention relates to mobile internet access and in particular to a method and apparatus for sending a security key to a mobile host for use in internet access.

BACKGROUND OF THE INVENTION

Corporate users have traditionally accessed the internet from a fixed location within a Local Area Network (LAN), a user's LAN often being referred to as his "home" network (HN). The user interface to the internet is typically a personal computer (the "host"). As is illustrated in FIG. 1, the home network is connected to an internet service provider which routes internet data, so-called "datagrams", between the home network and the internet, the internet in turn comprising other routers and service providers which route data to and from other "foreign" networks (FN).

In order to be able to transmit and receive datagrams to and from the internet, a host requires an internet address. A corporate home network is typically allocated a set of internet addresses by a national authority and the home network can assign these either fixedly or dynamically to hosts attached to the home network (using for example the Dyriamic Host Configuration Protocol DHCP). The allocated set of internet addresses comprise a common prefix portion which identifies the home network, whilst a suffix portion identifies the destination host. When a datagram is received by a home network, a router (R) of the home network polls the attached hosts to determine which host corresponds to the internet address conveyed with the datagram. The datagram is then forwarded by the router to the identified host.

With the recent rapid advances in mobile communication technology, and in particular of wireless technologies, there has come a desire to gain internet access from mobile hosts or terminals, for example a laptop computer coupled to a cellular telephone. At present, this is available via certain digital telephone networks (e.g. GSM). As with conventional fixed line internet access, a mobile host may have a fixedly or dynamically assigned internet address, allocated by a service provider who is usually the cellular telephone network operator. In the case of mobile internet access, a communication channel between the mobile host and the network is reserved for the duration of the call. Internet data destined for the mobile host is received by the network and is sent to the host over the reserved channel.

This system works satisfactorily whilst a mobile host remains within one homogeneous network. However, it does not provide for "roaming" between different types of networks or between networks operated by different operators. When a mobile host "de-registers" with one network and registers with a new network, there is no mechanism for forwarding internet datagrams, addressed to the old network, to the new network as the communication channel between the mobile host and the old network no longer exists. It is therefore necessary to open a new communication channel between the mobile host and the new network. All datagrams addressed to the old network and not yet received by the mobile host are lost as a result of this channel change.

The desire for roaming is likely to increase in the near future as the provision of corporate wireless LANs becomes commonplace. A corporate user will have the opportunity to make wireless voice and data calls from a mobile terminal via the corporate LAN whilst he is inside the coverage area of that LAN. When the user leaves that area, he will then be able to connect to a digital cellular telephone network. In addition, so-called "hot-spot" LANs are likely to be provided in areas where high data capacity is required, e.g. airports, shopping centres. In all probability, hot-spot LANs will be operated by the cellular network operators although they may of course be operated by the property owners themselves.

A mobile internet access protocol which provides for roaming is currently being standardised by the Internet Engineering Task Force (IETF). This protocol is known as RFC2002. A mobile internet protocol is also described in EP556012. These protocols make use of a "home agent", located in a mobile host's home network, to keep track of the host when it leaves the home network. A mobile host is fixedly allocated an internet address corresponding to the home network.

When a mobile host is registered to its home network, the functionality of the network's home agent is off for that host (i.e. the host is "deregistered" with the home agent) so that the home agent does not alter the flow of datagrams from the internet to the network's router and the mobile host (as indicated by reference numeral 1 in FIG. 2). When the mobile host leaves its home network and contacts a foreign network (FN), the host is registered with a foreign agent (FA) of that network. The foreign agent then transmits to the mobile host an internet address of the foreign agent, and the mobile host in turn transmits the received internet address to the home network's home agent, together with a registration instruction. The home agent registers the new status of the mobile host and records the newly allocated internet address as a "care-of-address" for the host. Whenever the mobile host registers with a new foreign network, a new care-of-address is sent to the home network's home agent to replace the previously registered care-of-address.

It will be appreciated that, as a mobile host has a fixed internet address allocated to it, datagrams destined for the host will always be sent to the home network. If a mobile host has an active internet connection when it passes from its home network to a foreign network, and a datagram destined for the host subsequently arrives at the home network, the home agent determines that the mobile host is registered with a foreign agent and forwards the datagrams to the registered care-of-address. A communication channel will have been reserved between the mobile host and the foreign agent, and the redirected datagram can be sent to the mobile host over this channel. Similarly, if a mobile host initiates a new internet access when registered with a foreign network, the host continues to use its allocated internet address. The home agent has already received the care-of-address and can again forward datagrams destined for the mobile host to the foreign agent for transfer to the host.

In some cases, the foreign network may dynamically assign an internet address to a visiting mobile host, e.g. if the foreign network does not have a foreign agent. This address is sent to the mobile host which in turn sends it to the home network's home agent as a care-of-address. Rather than just merely redirecting datagrams to the care-of-address, the home agent actually replaces the old internet address contained in the datagram with the co-located care-of-address before retransmitting the datagram. This particular form of care-of-address which identifies the mobile host as the "tunnel" end-point for the redirected datagrams, rather than a foreign agent, is known as a "co-located care-of-address". It is noted however, that when the mobile host is accessing the internet via the foreign network, it still uses its fixedly allocated internet address. It will therefore be appreciated that regardless of whether the home agent receives a care-of-address or a co-located care-of-address all datagrams directed to a mobile host pass through the home network's home agent (as indicated by reference numeral 2 in FIG. 2).

In a modification to the mobile internet access protocol described above, roaming of a mobile host from a home to a foreign network may be achieved by assigning a new internet address, in said second network, to the mobile host when the host leaves the home network for the foreign network. This new address is then transmitted from the mobile host to the home network's home agent where the new address is registered as a care-of-address or co-located care-of-address for the mobile host. Datagrams addressed to the new internet address are sent directly to the mobile host via the foreign network's "foreign" agent. On the other hand, datagrams addressed to an internet address previously assigned to the mobile host in the home network are forwarded, using the registered care-of-address or co-located care-of-address, from that network's home agent to the mobile host via the foreign network's foreign agent. This protocol is described below with reference to FIG. 3.

Current proposals for mobile internet access protocols have in common the feature that a care-of-address (or co-located care-of-address) must be sent from a mobile host to the host's home network when the host registers with a foreign network. The care-of-address is sent via the internet, together with authentication data generated from an authentication key and the care-of-address itself (or some other component of the registration message), where the secret authentication key is known to the mobile host and to the host's home network. A separate encryption key may also be used to encrypt other data sent between the mobile host and the home network.

A problem with this approach is that the internet is not necessarily a secure network and it is possible for third parties to intercept internet traffic. If a third party can also determine the authentication/encryption key then it may be possible for them to decrypt intercepted data. It may also be possible for a third party to send a false registration request and care-of-address to a mobile host's home network causing datagrams intended for that mobile host to be redirected to some other terminal.

A possible way to improve security is to allocate new authentication/encryption keys to a mobile host on a regular basis, e.g. every time the mobile host makes a new internet access request. However, as the new authentication/encryption key is sent via the internet, the possibility remains that each new key may be intercepted and determined.

SUMMARY OF THE INVENTION

It is an object of the present invention to overcome or at least mitigate the above noted disadvantages. In particular, it is an object of the present invention to provide for the secure transmission of security keys, for use in mobile internet access, between a mobile host and a home network of the mobile host, particularly when the mobile host is registered with a foreign network.

These and other objects are met by sending security keys, from a mobile host's home network to the mobile host, using a point-to-point packet switched service of a cellular radio telephone network.

According to a first aspect of the present invention there is provided a method of communicating data between a mobile host and a remote station over the internet, where both the mobile host and the remote station are registered with the same or different cellular radio telephone networks, the method comprising the steps of:

sending a security key, from the remote station to the mobile host, over the cellular radio telephone network(s) using a point-to-point packet switched service of the network(s);

receiving said security key at the mobile host, and using the received key to ensure the security of subsequent data transmissions between the mobile host and the remote station over the internet.

The present invention avoids the use of the internet to distribute a security key to a mobile terminal. Furthermore, distribution is achieved using a cellular radio telephone network messaging service which is inherently more secure than the internet.

In one embodiment of the present invention, the remote station is connected to a Local Area Network (LAN), the LAN being connected to the internet. The LAN is assigned as the home network of the mobile host, such that said remote terminal is the home agent of the mobile host. In accordance with mobile internet protocol (Mobile IP), when the mobile host is registered with a cellular radio telephone network which provides access for the mobile host to the internet, a care-of-address is sent from the mobile host to the home agent over the internet. The present invention is advantageously used to secure the transmission of said care-of-address. However, the present invention may also be used to encrypt and transmit other data between the mobile host and the home network.

In other embodiments of the present invention, the remote host is the home agent of a cellular telephone network, and that home agent is the home agent of the mobile host.

Preferably, the or each cellular radio telephone network is a GSM network and said point-to-point packet switched service is that known as the Short Message Service (SMS). In other embodiments of the present invention, said point-to-point packet switched service may be an Unstructured Supplementary Data (USSD) service or may be provided by way of a packet data channel (e.g. in a General Packet Radio Service GPRS).

Security keys which may be distributed by way of the present invention include, for example, authentication keys and encryption keys.

According to a second aspect of the present invention there is provided data communication apparatus comprising:

a mobile host arranged for connection to the internet and to a cellular radio telephone network and having first signal processing means for encrypting and decrypting data sent to and received from the internet;

a remote station arranged for connection to the internet and to a cellular radio telephone network, and having second signal processing means for securing data sent to and received from the internet, the remote station further comprising means for providing a security key and for sending the security key to the mobile host over the cellular radio telephone network(s) using a point-to-point packet switched service of the network(s);

the mobile host further comprising means for receiving said transmitted security key, wherein said security key may be used to secure subsequent data transmissions between the mobile host and the remote station over the internet.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION

Figure 1:
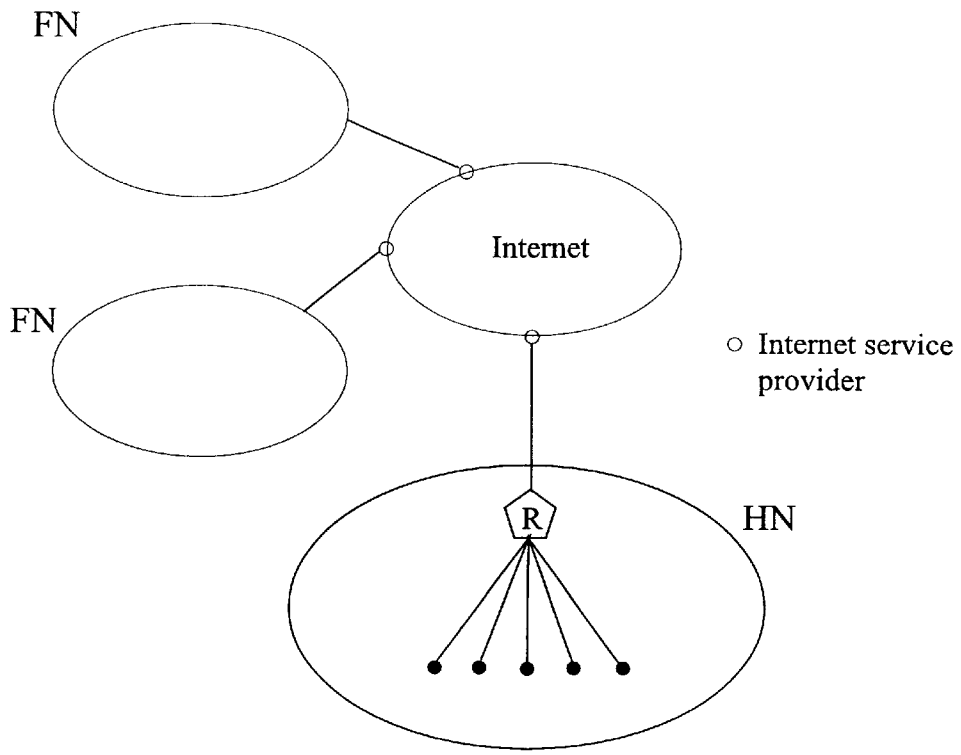
FIG. 1 illustrates schematically a fixed host internet access system.
Figure 2:
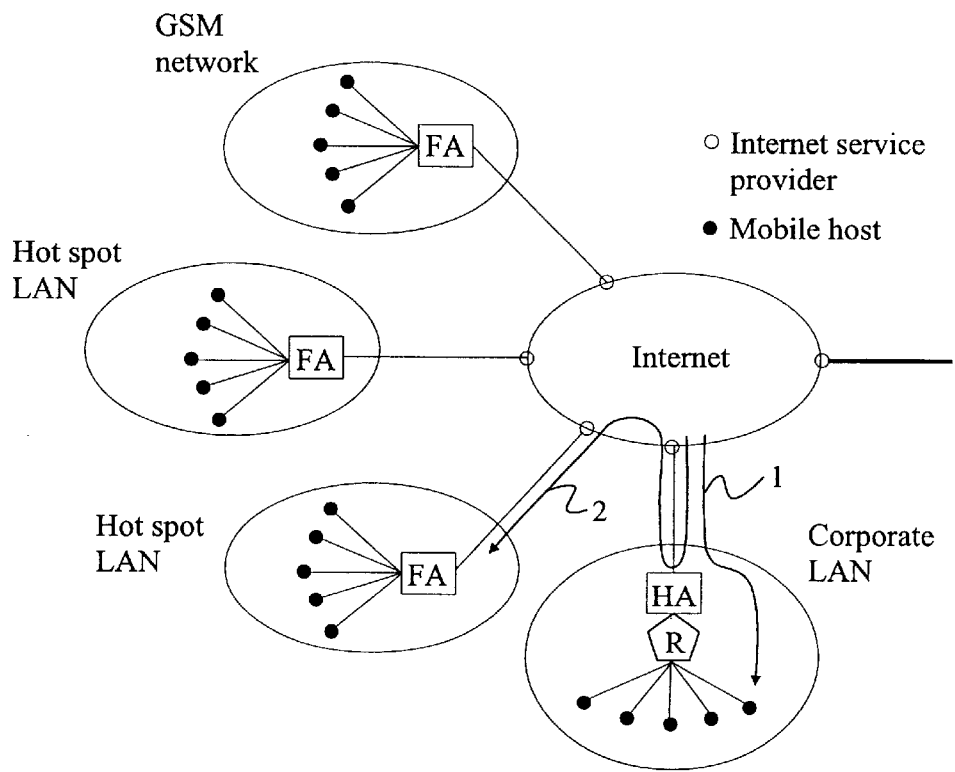
FIG. 2 illustrates schematically a mobile host internet access system.

As has already been described, FIGS. 1 and 2 illustrate respectively, conventional fixed host and mobile host internet access systems.

Figure 3:
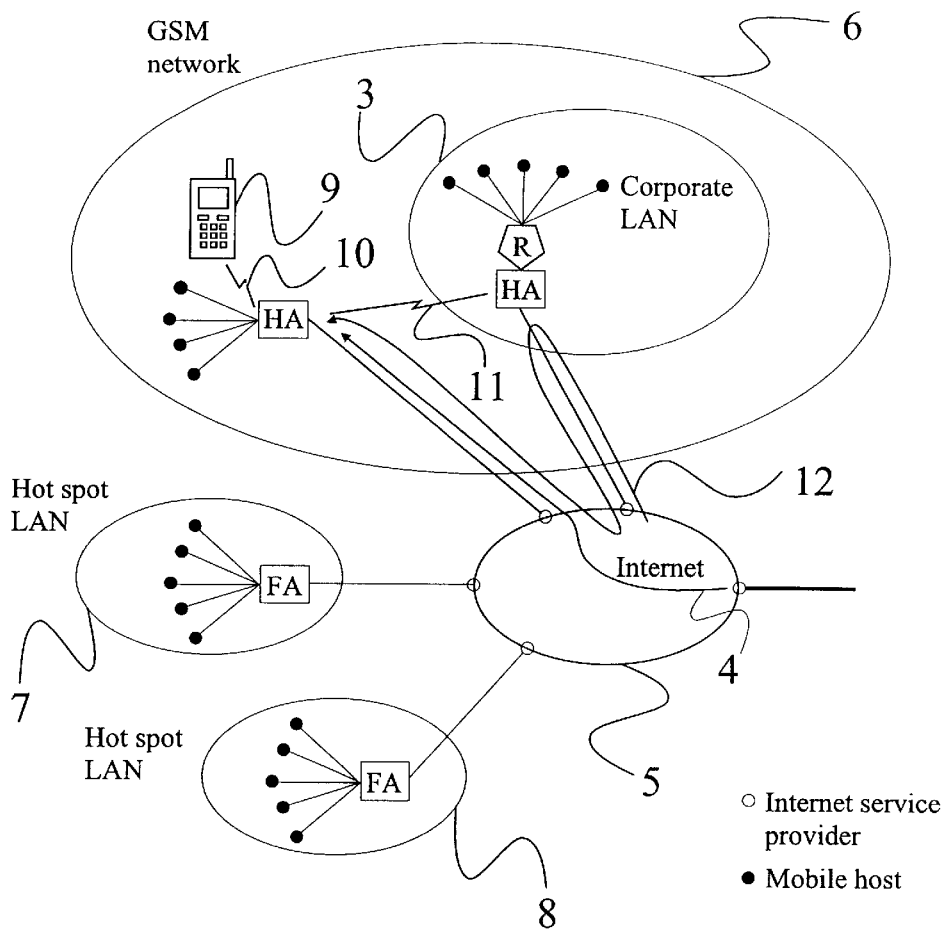
FIG. 3 illustrates schematically a modified mobile host internet access system which uses a cellular radio telephone network to distribute internet authentication keys.

With reference to FIG. 3, there is illustrated a wireless corporate LAN 3 in which a number of mobile hosts are coupled to a common network home agent (HA) via a router (R). The corporate LAN is connected via one or more fixed land lines 4 to an internet service provider which provides connectivity and routing functions between the corporate LAN 3 and the internet 5.

Whilst a mobile host is registered to the corporate LAN 3, the host either has a fixed internet address or an address dynamically assigned by the router. In either case, the host's address is one of those assigned to the corporate LAN 3. The home address is attached to datagrams sent from the mobile host to the internet 5 and enables return datagrams to be correctly delivered back to the home agent at the corporate LAN 3.

FIG. 3 also illustrates a GSM cellular telephone network 6 together with two so-called hot spot LANs 7,8. The GSM network 6 provides cellular telephone services to subscribers over a wide geographical area, encompassing the coverage area of the corporate LAN 3. The hot spot LANs 7,8 provide relatively high capacity telephone services over smaller, local areas which may overlap with that of the GSM network 6. In the present example, the GSM network 6 and the two hot spot LANs 7,8 are operated by the same operator.

If a mobile host subscribing to the corporate LAN 3 and to the cellular telephone network 6 leaves the coverage area of the corporate LAN and enters that of the cellular telephone network (either GSM or hot spot LAN), the host will deregister with the former whilst registering with the latter. An example mobile host 9 is shown in FIG. 3, registered to the GSM network 6.

Figure 4:
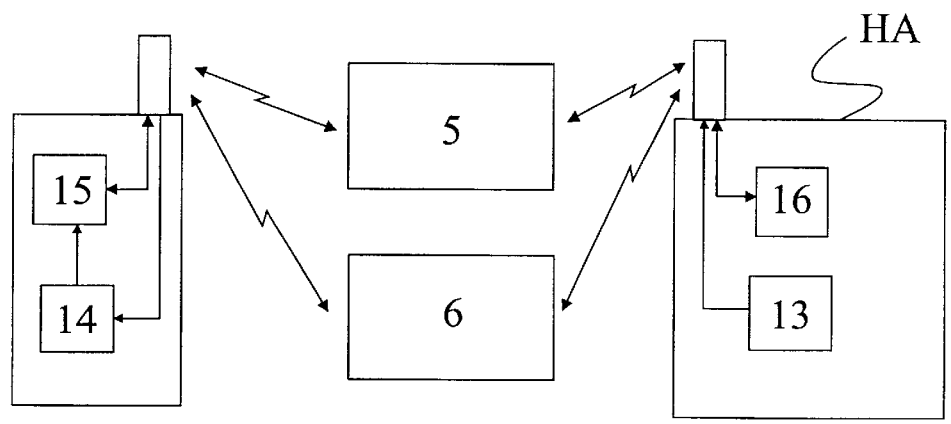
FIG. 4 illustrates a mobile host and a home agent of the system of FIG. 3.

The home network's home agent is provided with a GSM terminal which enables the home agent to connect wirelessly to the GSM network 6. Whenever the mobile host 9 is turned on and registered to the GSM network 6, a request is sent from the mobile host 9 to the home network's home agent for transmission of an internet authentication key. This request is made using the GSM network's Short Message Service (SMS) and transmission occurs via the GSM network's home agent and wireless channels 10,11 coupling the mobile host 9 and the home network's home agent to the GSM network's home agent (illustrated in simplified form in FIG. 4). Upon receipt of the request, a signal processing unit 13 within the home network's home agent generates a unique authentication key and transmits this, again via SMS, to the mobile host 9 where it is received by a signal processing unit 14. SMS is an inherently secure way of distributing authentication keys as the source and destination of an SMS message are authenticated by the GSM network 6.

Upon registration with the GSM network 6, the network 6 assigns and transmits to the mobile host 9 a new internet address in that network. This new address is either one of a number of addresses allocated to the GSM network 6 and defining the home agent as the tunnel end-point, or is dynamically assigned to the mobile host 9 (e.g. using DHCP) to define the mobile host 9 as the tunnel end-point. In either case, the new address replaces the internet address allocated to the host when it was registered to the corporate LAN 3. Datagrams destined for the mobile host 9, and initiated via the GSM network 6, are now sent directly to the GSM network (see reference numeral 12 in FIG. 3).

In the case that a mobile host registers with one of the hot spot LANs 7,8, the mobile host is again allocated a care-of-address which identifies the GSM network's home agent as the tunnel end-point. The home agent additionally records forwarding information for the mobile host in the hot spot LAN so that received datagrams can be sent to the mobile host. An authentication key is also sent to the mobile host via SMS.

Whilst new datagrams will be directed to the mobile host 9 at the new internet address, some datagrams initiated using the old address in the corporate LAN 3 may still be in transit. A registration message is therefore transmitted, over the internet 5, from the mobile host 9 to the corporate LAN's home agent to register the mobile host's new internet address with the home agent (either as a care-of-address or as a co-located care-of-address). As the internet 5 is an inherently unsecure transmission medium, the registration request and the care-of-address are supplemented, at the mobile host 9, with "authentication" data. This is data generated by a second signal processing unit 15 of the mobile host using a hash function applied to the received authentication key and the actual message data, i.e. authentication_data=hash_function(authentication_key, message_data). A typical hash function is that known as MD5. Given that the home network's home agent knows the authentication key used by the mobile host 9, the home agent can authenticate the mobile host 9 using the authentication key, and the received message and authentication data.

If the corporate LAN 3 subsequently receives datagrams destined for the mobile host 9, the corporate LAN's home agent determines that the mobile host 9 is now registered with a foreign network and it redirects the datagrams to the care-of-address or co-located care-of-address now registered for the mobile host 9. The GSM network's home agent receives these forwarded datagrams and redirects them to the mobile host 9, either directly or via a foreign agent in a hot spot LAN. This redirection route is indicated in FIG. 3 by reference numeral 4.

When the mobile host 9 moves between different "subnetworks" of the cellular telephone network, e.g. from the GSM network to a hot spot LAN, there is no need to update the care-of-address or co-located care-of-address at the corporate network's home agent. It is only necessary to update the location details of the mobile host at the GSM network's home agent.

On the mobile host 9 returning from the cellular telephone network to the corporate LAN, the process described above is repeated in reverse. The mobile host deregisters to the cellular telephone network and registers with the corporate LAN. The mobile host sends its new internet address in the corporate LAN to the home agent of the GSM network as a care-of-address (or co-located care-of-address) for the mobile host. In order to ensure security, the new corporate LAN based internet address may be sent to the GSM network via an SMS message.

It will be appreciated by a person of skill in the art that modifications may be made to the above described embodiment without departing from the scope of the present invention. For example, in the embodiment described above, the home agent of the mobile host 9 is the home agent of the corporate LAN 3. However, the mobile host's home agent, i.e. the agent to which the care-of-addresses are sent, may be the home agent of any one of the networks, e.g. the home agent of the GSM network 6.

What is claimed is:

1. A method of communicating data between a mobile host and a remote station over the internet, where both the mobile host and the remote station are registered with the same or different cellular radio telephone networks, the method comprising the steps of:

sending a security key, from the remote station to the mobile host, over the cellular radio telephone network(s) using a point-to-point packet switched service of the network(s);

receiving said security key at the mobile host, and using the received key to secure subsequent data transmissions between the mobile host and the remote station over the internet.

2. A method according to claim 1, wherein the remote station is connected to a Local Area Network (LAN), the LAN being connected to the internet, and the mobile host is wirelessly connected to the internet via the mobile host's cellular radio telephone network.

3. A method according to claim 2, wherein:

said LAN is assigned as the home network of the mobile host so that said remote terminal is the home agent of the mobile host;

the mobile host is registered with a cellular radio telephone network which provides access for the mobile host to the internet; and a care-of-address is sent from the mobile host to the home agent over the internet encrypted with said security key.

4. A method according to claim 1, wherein the remote station is the home agent of a cellular telephone network.

5. A method according to claim 4, wherein the remote station is designated as the home agent of the mobile host, as defined by mobile internet protocol.

6. A method of communicating data between a mobile host and a remote station over the internet, where both the mobile host and the remote station are registered with the same or different cellular radio telephone networks, the method comprising the steps of:

sending a security key, from the remote station to the mobile host, over the cellular radio telephone network(s) using a point-to-point packet switched service of the network(s); and receiving said security key at the mobile host, and using the received key to secure subsequent data transmissions between the mobile host and the remote station over the internet;

wherein the or each cellular radio telephone network is a GSM network and said point-to-point packet switched service is the Short Message Service (SMS).

7. Data communication apparatus comprising:

a mobile host arranged for connection to the internet and to a cellular radio telephone network and having first signal processing means for encrypting and decrypting data sent to and received from the internet;

a remote station arranged for connection to the internet and to a cellular radio telephone network, and having second signal processing means for encrypting and decrypting data sent to and received from the internet, the remote station further comprising means for providing a security key and for sending the security key to the mobile host over the cellular radio telephone network(s) using a point-to-point packet switched service of the network(s);

the mobile host further comprising means for receiving said transmitted security key, wherein said security key may be used to secure subsequent data transmissions between the mobile host and the remote station over the internet.

8. A method of communicating data between a mobile host and a remote station over the internet, where both the mobile host and the remote station are registered with the same or different cellular radio telephone networks, the method comprising the steps of:

sending a security key, from the remote station to the mobile host, over the cellular radio telephone network(s) using a point-to-point packet switched service of the network(s);

receiving said security key at the mobile host, and using the received key to generate authentication data, the authentication data being sent to the remote station to secure subsequent data transmissions between the mobile host and the remote station over the internet.

9. A method according to claim 8, wherein the remote station is connected to a Local Area Network (LAN), the LAN being connected to the internet, and the mobile host is wirelessly connected to the internet via the mobile host's cellular radio telephone network.

10. A method according to claim 9, wherein:

said LAN is assigned as the home network of the mobile host so that said remote terminal is the home agent of the mobile host;

the mobile host is registered with a cellular radio telephone network which provides access for the mobile host to the internet; and a care-of-address is sent from the mobile host to the home agent over the internet encrypted with said security key.

11. A method according to claim 8, wherein the remote station is the home agent of a cellular telephone network.

12. A method according to claim 11, wherein the remote station is designated as the home agent of the mobile host, as defined by mobile internet protocol.

13. A method according to claim 8, wherein the or each cellular radio telephone network is a GSM network and said point-to-point packet switched service is the Short Message Service (SMS).

\* \* \* \* \*